(12) United States Patent
Kim et al.

(10) Patent No.: US 12,404,572 B2
(45) Date of Patent: Sep. 2, 2025

(54) ORIENTED ELECTRICAL STEEL SHEET AND METHOD FOR PREPARING SAME

(71) Applicant: POSCO CO., LTD, Pohang-si (KR)

(72) Inventors: Jae Kyoum Kim, Pohang-si (KR); Kyu-Seok Han, Pohang-si (KR); Chang Soo Park, Pohang-si (KR); Jin-Wook Seo, Pohang-si (KR); Yujun Park, Pohang-si (KR)

(73) Assignee: POSCO CO., LTD, Pohang-si (KR)

( * ) Notice: Subject to any disclaimer, the term of this patent is extended or adjusted under 35 U.S.C. 154(b) by 378 days.

(21) Appl. No.: 18/128,650

(22) Filed: Mar. 30, 2023

(65) Prior Publication Data
US 2023/0235434 A1    Jul. 27, 2023

Related U.S. Application Data

(62) Division of application No. 16/957,943, filed as application No. PCT/KR2018/005676 on May 17, 2018, now abandoned.

(30) Foreign Application Priority Data

Dec. 26, 2017 (KR) .................. 10-2017-0179927

(51) Int. Cl.
| | | |
|---|---|---|
| *C22C 38/16* | (2006.01) | |
| *C21D 8/02* | (2006.01) | |
| *C21D 9/00* | (2006.01) | |
| *C22C 38/00* | (2006.01) | |
| *C22C 38/02* | (2006.01) | |
| *C22C 38/04* | (2006.01) | |
| *C22C 38/06* | (2006.01) | |

(52) U.S. Cl.
CPC ............ *C22C 38/16* (2013.01); *C21D 8/0205* (2013.01); *C21D 8/0226* (2013.01); *C21D 8/0236* (2013.01); *C21D 9/0081* (2013.01); *C22C 38/001* (2013.01); *C22C 38/002* (2013.01); *C22C 38/02* (2013.01); *C22C 38/04* (2013.01); *C22C 38/06* (2013.01)

(58) Field of Classification Search
CPC ..... C22C 38/16; C22C 38/001; C22C 38/002; C22C 38/02; C22C 38/04; C22C 38/06; C22C 38/004; C22C 38/00; C22C 38/60; C21D 8/0205; C21D 8/0226; C21D 8/0236; C21D 9/0081; C21D 6/00; C21D 6/008; C21D 8/1205; C21D 8/1244; C21D 8/12; C21D 8/1272; C21D 9/46; C21D 8/1222; C21D 8/1233; C21D 2201/05; Y02P 10/20

See application file for complete search history.

(56) References Cited

U.S. PATENT DOCUMENTS

| | | |
|---|---|---|
| 2002/0011278 A1 | 1/2002 | Komtasubara et al. |
| 2004/0099342 A1 | 5/2004 | Cicale et al. |
| 2014/0338794 A1 | 11/2014 | Shingaki et al. |
| 2015/0170813 A1 | 6/2015 | Shingaki et al. |

FOREIGN PATENT DOCUMENTS

| | | |
|---|---|---|
| EP | 2878689 A1 | 6/2015 |
| JP | H01-230721 A | 9/1989 |
| JP | H01-283324 A | 11/1989 |
| JP | H05-263135 A | 10/1993 |
| JP | H06-336611 A | 12/1994 |
| JP | H07-17957 B2 | 3/1995 |
| JP | H10-140297 A | 5/1998 |
| JP | 2000-109931 A | 4/2000 |
| JP | 2001-003145 A | 1/2001 |
| JP | 2008063655 A | 3/2008 |
| JP | 2010-236013 A | 10/2010 |
| JP | 2011-208188 A | 10/2011 |
| JP | 2015-052589 A | 3/2015 |
| JP | 2016-156070 A | 9/2016 |
| JP | WO2017/145907 A1 | 8/2017 |
| KR | 10-1998-080664 A | 11/1998 |
| KR | 10-1999-0088437 A | 12/1999 |
| KR | 10-2012-0071820 A | 7/2012 |
| KR | 10-2012-0071822 A | 7/2012 |
| KR | 10-2012-0071823 A | 7/2012 |
| KR | 10-2012-0071825 A | 7/2012 |

(Continued)

OTHER PUBLICATIONS

International Search Report and Written Opinion issued in corresponding International Application No. PCT/KR2018/005676 mailed Sep. 19, 2018, with English translation.

(Continued)

*Primary Examiner* — Adil A. Siddiqui

(74) *Attorney, Agent, or Firm* — Morgan Lewis & Bockius LLP

(57) ABSTRACT

An oriented electrical steel sheet according to an embodiment of the present invention includes, in a unit of wt %, Si at 1.0 wt % to 5.0 wt %, C at 0.005 wt % or less (excluding 0 wt %), Mn at 0.001 wt % to 0.1 wt %, Cu at 0.001 wt % to 0.1 wt %, S at 0.001 wt % to 0.020 wt %, Se at 0.001 wt % to 0.050 wt %, Al at 0.0005 wt % to 0.010 wt %, N at 0.0005 wt % to 0.005 wt %, and the remainder of Fe and inevitable impurities.

The oriented electrical steel sheet according to the embodiment of the present invention satisfies Equation 1.

$$16 \leq (10 \times [Mn] + [Cu])/([S] + [Se]) + (0.02 - [Al])/[N] \leq 20 \quad [\text{Equation 1}]$$

(In Equation 1, [Mn], [Cu], [S], [Se], [Al], and [N] represent contents (wt %) of Mn, Cu, S, Se, Al, and N, respectively.)

4 Claims, No Drawings

(56) References Cited

FOREIGN PATENT DOCUMENTS

| KR | 10-2013-0056420 A | 5/2013 |
| KR | 10-2014-0010477 A | 1/2014 |
| KR | 10-2014-0044928 A | 4/2014 |
| KR | 10-2014-0084893 A | 7/2014 |
| KR | 10-2014-0084897 A | 7/2014 |
| KR | 10-2014-0128923 A | 11/2014 |
| KR | 10-2015-0015044 A | 2/2015 |
| KR | 10-2015-0073720 A | 7/2015 |
| KR | 10-2015-0073796 A | 7/2015 |
| KR | 10-2015-0073802 A | 7/2015 |
| KR | 10-1707451 B1 | 2/2017 |
| KR | 10-2018-0073323 A | 7/2018 |
| KR | 10-2019-0078163 A | 7/2019 |
| KR | 10-2019-0078390 A | 7/2019 |
| WO | 1998/46802 A1 | 10/1998 |

OTHER PUBLICATIONS

Final Office Action dated Dec. 30, 2022 issued in U.S. Appl. No. 16/957,943.
Non-Final Office Action dated Aug. 16, 2022 issued in U.S. Appl. No. 16/957,943.
Hayakawa, et al., JP-2011-208188A google patents machine translation printed on Aug. 10, 2022, Oct. 20, 2011, entire translation (Year: 2011).
Final Office Action dated Apr. 14, 2022 issued in U.S. Appl. No. 16/957,943.
Non-Final Office Action dated Dec. 24, 2021 issued in U.S. Appl. No. 16/957,943.
Omura et al., JP 2010-236013 machine translation, Feb. 19, 2014, entire translation (Year: 2014).
Japanese Office Action dated Jul. 13, 2021 issued in Japanese Patent Application No. 2020-536260.
Extended European Search Report dated Aug. 12, 2020 issued in European Patent Application No. 18897459.6.

ORIENTED ELECTRICAL STEEL SHEET AND METHOD FOR PREPARING SAME

CROSS REFERENCE

This application is a Divisional patent Application of U.S. patent application Ser. No. 16/957,943, filed on Jun. 25, 2020, which is the U.S. National Phase under 35 U.S.C. § 371 of International Application No. PCT/KR2018/005676, filed on May 17, 2018, which claims the benefit of Korean Application No. 10-2017-0179927, filed on Dec. 26, 2017, the entire contents of each are hereby incorporated by reference.

TECHNICAL FIELD

Background Art

(a) Field of the Invention

The present invention relates to an oriented electrical steel sheet and a method for preparing the oriented electrical steel sheet. Specifically, the present invention relates to an oriented electrical steel sheet and a method for preparing the oriented electrical steel sheet that may be excellent in magnetism by stably growing grains with a very high degree of integration into a Goss orientation during secondary recrystallization high temperature annealing using S- and Se-based precipitates. More specifically, the present invention relates to an oriented electrical steel sheet and a method for preparing the oriented electrical steel sheet that may have excellent magnetic properties by controlling a correlation between Mn, Cu, S, Se, Al, and N in an alloy component.

(B) Description of the Related Art

An oriented electrical steel sheet is a soft magnetic material used as an iron core for electronic equipment that has excellent magnetic properties in a rolling direction and requires excellent magnetic properties in one direction, such as a transformer, and it is made by forming a Goss texture ({110}<001> aggregate) on an entire steel sheet by using an abnormal grain growth phenomenon called secondary recrystallization. Generally, the magnetic properties may be described by a magnetic flux density and iron loss, and a high magnetic flux density may be obtained by precisely arranging an orientation of grains in a {110}<001> orientation. The electrical steel sheet having a high magnetic flux density not only makes it possible to reduce a size of an iron core material of an electric device, but also reduces hysteresis loss, thereby achieving miniaturization and high efficiency of the electric device at the same time. Iron loss is power loss consumed as heat energy when an arbitrary alternating magnetic field is applied to a steel sheet, and it largely changes depending on a magnetic flux density and a thickness of the steel sheet, an amount of impurities in the steel sheet, specific resistance, and a size of a secondary recrystallization grain, wherein the higher the magnetic flux density and the specific resistance and the lower the thickness and the amount of impurities in the steel sheet, the lower the iron loss and the higher the efficiency of the electric device. Unlike typical grain growth, the secondary recrystallization of the oriented electrical steel sheet occurs when movement of a grain boundary in which grains normally grow is suppressed by precipitates, inclusions, or elements that are dissolved or segregated in the grain boundaries In addition, in order to grow grains with a high degree of integration with respect to the Goss orientation, complex processes such as component control in steel making, slab reheating and hot rolling process factor control in hot rolling, hot rolled sheet annealing heat treatment, primary recrystallization annealing, and secondary recrystallization annealing, are required, and these processes should also be managed very accurately and rigorously. As described above, the precipitates and inclusions that inhibit the grain growth are specifically referred to as grain growth inhibitors, and studies on a preparation technology of the oriented electrical steel sheets by the secondary recrystallization of Goss orientation have been focused on securing superior magnetic properties by using a strong grain growth inhibitor to form secondary recrystallization with high integration to Goss orientation. MnS was used as a grain growth inhibitor in the oriented electrical steel sheet which was initially developed, and it was prepared by a method of cold rolling two times. Accordingly, the secondary recrystallization was stably formed, but the magnetic flux density was not so high and the iron loss was high. Thereafter, a method of preparing an oriented electrical steel sheet by using a combination of AlN and MnS precipitates and then one-time cold rolling has been proposed. Recently, an oriented electrical steel sheet preparing method in which secondary recrystallization is caused by an Al-based nitride exhibiting a strong grain growth inhibiting effect by supplying nitrogen into the steel sheet through a separate nitriding process using ammonia gas after decarburizing after one-time cold rolling without using MnS has been proposed. So far, a preparing method in which precipitates such as AlN and MnS [Se] are used as the grain growth inhibitor to cause secondary recrystallization have been mainly used. Such a preparing method has an advantage of stably forming secondary recrystallization, but in order to having a strong grain growth inhibiting effect, the precipitates should be distributed very finely and uniformly on the steel sheet. In order to uniformly distribute the fine precipitates in this manner, a slab should be heated at a high temperature for a long period of time before hot rolling to dissolve coarse precipitates present in the steel, and then hot rolled in a very short time to complete the hot rolling without precipitation. This requires a large-sized slab heating equipment, and in order to minimize precipitation as much as possible, there are restrictions that a hot rolling and a winding process must be strictly controlled in order to suppress the precipitation as much as possible, and that the precipitates solidified in a hot rolled sheet annealing step after hot-rolling should be controlled so as to be finely precipitated. In addition, when the slab is heated at a high temperature, a slab washing phenomenon occurs due to formation of $Fe_2SiO_4$ having a low melting point, thereby decreasing actual yields. Recently, a preparing method of an oriented electrical steel sheet by a slab low temperature heating method in which secondary recrystallization is formed by AlN-based nitride precipitates through nitriding after decarburization annealing after cold rolling, has been developed and proposed. However, in order to use this method, it is substantially necessary to additionally prepare a nitride-based inhibitor in the annealing process after the slab heating. To this end, nitriding is performed using ammonia gas in the primary recrystallization annealing process. The ammonia gas has a property of decomposing into hydrogen and nitrogen at a temperature of about 500° C. or higher, and by using this, nitriding is performed and then penetrated nitrogen reacts with a nitride forming element in the steel sheet to form nitrides such as AlN and (Al,Si)N to act as an inhibitor. The low temperature heating method also has many limitations in the preparing process so as to control precipitates, and thus does not solve problems caused by complexity in the preparing process. Therefore, in order to improve the magnetism and productivity of the oriented electrical steel sheet, there is a need for an oriented electrical steel sheet preparing technology using a precipitate that is easy to control because the precipitation decomposition temperature is not excessively high.

DISCLOSURE

The present invention has been made in an effort to provide an oriented electrical steel sheet and a method for preparing the oriented electrical steel sheet. Specifically, the present invention has been made in an effort to provide an oriented electrical steel sheet and a method for preparing the oriented electrical steel sheet that may be excellent in magnetism by stably growing grains with a very high degree of integration into a Goss orientation during secondary recrystallization high temperature annealing using S- and Se-based precipitates. More specifically, the present invention has been made in an effort to provide an oriented electrical steel sheet and a method for preparing the oriented electrical steel sheet that may have excellent magnetic properties by controlling a correlation between Mn, Cu, S, Se, Al, and N in an alloy component.

An embodiment of the present invention provides an oriented electrical steel sheet, including, in a unit of wt %, Si at 1.0 wt % to 5.0 wt %, C at 0.005 wt % or less (excluding 0 wt %), Mn at 0.001 wt % to 0.1 wt %, Cu at 0.001 wt % to 0.1 wt %, S at 0.001 wt % to 0.020 wt %, Se at 0.001 wt % to 0.050 wt %, Al at 0.0005 wt % to 0.010 wt %, N at 0.0005 wt % to 0.005 wt %, and the remainder of Fe and inevitable impurities.

The oriented electrical steel sheet according to the embodiment of the present invention satisfies Equation 1.

$$16 \leq (10 \times [Mn]+[Cu])/([S]+[Se])+(0.02-[Al])/[N] \leq 20 \quad \text{[Equation 1]}$$

(In Equation 1, [Mn], [Cu], [S], [Se], [Al], and [N] represent contents (wt %) of Mn, Cu, S, Se, Al, and N, respectively.)

The oriented electrical steel sheet may satisfy Equation 2.

$$0.016 \leq [S]+[Se] \leq 0.05$$

(In Equation 2, [S] and [Se] represent contents (wt %) of S and Se, respectively.)

The oriented electrical steel sheet may satisfy Equation 3.

$$0.5 \leq [Al]/[N] \leq 3.0$$

(In Equation 3, [Al] and [N] represent contents (wt %) of Al and N, respectively.)

Another embodiment of the present invention provides a preparing method of an oriented electrical steel sheet, including: preparing a slab including, in a unit of wt %, Si at 1.0 wt % to 5.0 wt %, C at 0.001 wt % to 0.10 wt %, Mn at 0.001 wt % to 0.1 wt %, Cu at 0.001 wt % to 0.1 wt %, S at 0.001 wt % to 0.020 wt %, Se at 0.001 wt % to 0.050 wt %, Al at 0.0005 wt % to 0.010 wt %, N at 0.0005 wt % to 0.005 wt %, and the remainder of Fe and inevitable impurities, and satisfying Equation 1; heating the slab; hot rolling the slab to prepare a hot rolled sheet; cold rolling the hot rolled sheet to prepare a cold rolled sheet; and secondary recrystallization annealing the cold rolled sheet in which the primary recrystallization annealing is completed.

$$16 \leq (10 \times [Mn]+[Cu])/([S]+[Se])+(0.02-[Al])/[N] \leq 20 \quad \text{[Equation 1]}$$

(In Equation 1, [Mn], [Cu], [S], [Se], [Al], and [N] represent contents (wt %) of Mn, Cu, S, Se, Al, and N, respectively.)

The heating of the slab may include heating the slab at 1000 to 1250° C.

The cold rolled sheet in which the primary recrystallization annealing is completed may include one or more precipitates of (Fe,Mn,Cu)S and (Fe,Mn,Cu)Se.

The primary recrystallization annealing may be performed in a hydrogen and nitrogen mixed atmosphere at a dew point temperature of 50° C. to 70° C.

Magnetism of the oriented electrical steel sheet according to the embodiment of the present invention is excellent by control a correlation between Mn, Cu, S, Se, Al, and N in an alloy component and by stably growing grains with a very high degree of integration into a Goss orientation during secondary recrystallization high temperature annealing using S- and Se-based precipitates, in which it is easy to control the precipitates.

MODE FOR INVENTION

It will be understood that, although the terms first, second, third, etc. may be used herein to describe various elements, components, regions, layers, and/or sections, they are not limited thereto. These terms are only used to distinguish one element, component, region, layer, or section from another element, component, region, layer, or section. Therefore, a first part, component, area, layer, or section to be described below may be referred to as second part, component, area, layer, or section within the range of the present invention.

The technical terms used herein are to simply mention a particular embodiment and are not meant to limit the present invention. An expression used in the singular encompasses an expression of the plural, unless it has a clearly different meaning in the context. In the specification, it is to be understood that the terms such as "including", "having", etc., are intended to indicate the existence of specific features, regions, numbers, stages, operations, elements, components, and/or combinations thereof disclosed in the specification, and are not intended to preclude the possibility that one or more other features, regions, numbers, stages, operations, elements, components, and/or combinations thereof may exist or may be added.

When referring to a part as being "on" or "above" another part, it may be positioned directly on or above another part, or another part may be interposed therebetween. In contrast, when referring to a part being "directly above" another part, no other part is interposed therebetween.

Unless otherwise defined, all terms used herein, including technical or scientific terms, have the same meanings as those generally understood by those with ordinary knowledge in the field of art to which the present invention belongs. Terms defined in commonly used dictionaries are further interpreted as having meanings consistent with the relevant technical literature and the present disclosure, and are not to be construed as having idealized or very formal meanings unless defined otherwise.

Unless otherwise stated, % means % by weight, and 1 ppm is 0.0001% by weight.

Further, in exemplary embodiments of the present invention, inclusion of an additional element means replacing remaining iron (Fe) by an additional amount of the additional elements.

The present invention will be described more fully hereinafter, in which exemplary embodiments of the invention are shown. As those skilled in the art would realize, the described embodiments may be modified in various different ways, all without departing from the spirit or scope of the present invention.

An oriented electrical steel sheet according to an embodiment of the present invention includes, in a unit of wt %, Si at 1.0 wt % to 5.0 wt %, C at 0.005 wt % or less (excluding 0 wt %), Mn at 0.001 wt % to 0.1 wt %, Cu at 0.001 wt % to 0.1 wt %, S at 0.001 wt % to 0.020 wt %, Se at 0.001 wt % to 0.050 wt %, Al at 0.0005 wt % to 0.010 wt %, N at 0.0005 wt % to 0.005 wt %, and the remainder of Fe and inevitable impurities.

Hereinafter, the reason for limiting the components of the oriented electrical steel sheet will be described.

Si at 1.0 to 5.0 wt %

Silicon (Si) increases specific resistance of the oriented electrical steel sheet, and thus serves to decrease core loss, that is, iron loss. When a Si content is excessively small, the specific resistance decreases, eddy current loss increases, and thus the iron loss may deteriorate. In addition, during primary recrystallization annealing, phase transformation between ferrite and austenite occurs, so a primary recrystallized texture may be severely damaged. In addition, phase transformation between ferrite and austenite occurs during secondary recrystallization annealing, thus the second recrystallization may become unstable, and a Goss texture may be severely damaged. When the Si content is excessively large, oxide layers of $SiO_2$ and $Fe_2SiO$ are excessively and densely formed during decarburization in primary recrystallization annealing, thus decarburization behavior may be delayed. In addition, brittleness of the steel increases, and toughness thereof decreases, so an occurrence rate of plate rupture during a rolling process may be intensified. In addition, weldability between plates may be degraded, making it difficult to secure easy workability. Therefore, Si may be included at 1.0 to 5.0 wt %. Specifically, it may be included at 2.0 to 4.0 wt %.

C at 0.005 wt % or Less

Carbon (C) is an element that contributes to refining grains and to improve elongation by causing phase transformation between ferrite and austenite. C is an essential element for improving rollability of an electric steel sheet having poor rolling properties due to high brittleness. However, when it remains in a final product, it must be controlled to an appropriate content because it is an element that deteriorates magnetic properties by precipitating carbides formed due to a magnetic aging effect in a product sheet. In the embodiment of the present invention, during the primary recrystallization annealing in the preparing process, a decarburization process is performed, and the C content in the final electrical steel sheet prepared after the decarburization annealing may be 0.005 wt % or less. More specifically, it may be 0.003 wt % or less.

C of 0.001 to 0.10 wt % may be included in the slab. When the slab contains too little C, phase transformation between austenite does not sufficiently occur, causing unevenness of the slab and the hot-rolled microstructure. As a result, cold rolling properties are also deteriorated. When it contains too much C, sufficient decarburization may not be obtained in a decarburization process. Therefore, due to the phase transformation phenomenon caused by this, the secondary recrystallized texture is severely damaged. Further, when the final product is applied to a power apparatus, it may cause deterioration of magnetic properties due to self-aging. More specifically, C at 0.01 to 0.1 wt % may be included in the slab.

Mn at 0.001 to 0.1 wt %

Manganese (Mn) has the effect of reducing the iron loss by increasing the specific resistance, like Si. In addition, it is an important element for forming secondary precipitates as a grain growth inhibitor by forming S- and Se-based precipitates. When a content of Mn is excessively small, a sufficient effect as an inhibitor may not be expected because the amount and volume formed are small. When the content of Mn is excessively large, a large amount of (Fe, Mn) and Mn oxide in addition to $Fe_2SiO_4$ is formed on a surface of the steel sheet, which inhibits formation of a base coating formed during the secondary recrystallization annealing, thereby lowering surface quality, and in the primary recrystallization annealing process, non-uniformity of phase transformation between ferrite and austenite causes a size of the primary recrystallized grains to be non-uniform, resulting in unstable secondary recrystallization. Therefore, the content of Mn may be limited to 0.001 to 0.10 wt %. Specifically, Mn may be included in an amount of 0.01 to 0.05 wt %.

Cu at 0.001 to 0.10 wt %

Copper (Cu) is an important element for forming secondary recrystallization as a grain growth inhibitor by forming S- and Se-based precipitates like Mn. When a Cu content is excessively small, a sufficient effect as an inhibitor may not be expected. In contrast, when the content thereof is excessively large, a decomposition temperature of the precipitate is excessively high, which makes it difficult to control the precipitate. Therefore, the content of Cu may be limited to 0.001 to 0.10 wt %. Specifically, Cu may be included in an amount of 0.01 to 0.07 wt %.

S at 0.001 to 0.020 wt %

Sulfur (S) is an important element for forming secondary precipitates as a grain growth inhibitor by forming S- and Se-based precipitates. When a S content is excessively small, an effect of inhibiting grain growth may be deteriorated. When the S content is excessively large, occurrence of edge cracks in continuous casting and hot rolling processes may increase, so that an actual yield may decrease. Therefore, the content of S may be limited to 0.001 to 0.020 wt %. Specifically, S may be included in an amount of 0.007 to 0.015 wt %.

Se at 0.001 to 0.050 wt %

Selenium (Se) is an important element for forming secondary precipitates as a grain growth inhibitor by forming S- and Se-based precipitates like S. In the embodiment of the present invention, Se is added in combination with S in order to inhibit edge cracking during slab continuous casting and hot rolling processes due to an excessive S content. When a Se content is excessively small, an effect of inhibiting grain growth may be deteriorated. When the Se content is excessively large, occurrence of edge cracks in continuous casting and hot rolling processes may increase, so that an actual yield may decrease. Therefore, the Se content may be limited to 0.001 to 0.050 wt %. Specifically, Se may be included in an amount of 0.007 to 0.03 wt %.

Al at 0.0005 to 0.010 wt %

Aluminum (Al) is combined with nitrogen in the steel to form AlN precipitates. In the present invention, S- and Se-based precipitates are used as a grain growth inhibitor, and insufficient grain growth inhibition is solved by using the AlN precipitates. When an Al content is excessively large, a decomposition temperature of the AlN precipitate becomes excessively high, and the grain growth inhibition ability by the AlN increases, which affects the secondary recrystallization by the S- and Se-based precipitates. When the Al content is excessively small, the grain growth inhibition ability by the AlN precipitate may not be expected.

Therefore, the Al content may be limited to 0.0005 to 0.010 wt %. Specifically, Al may be included in an amount of 0.0015 to 0.01 wt %.

N at 0.0005 to 0.005 wt %

Nitrogen (N) reacts with Al to form AlN precipitates. For the same reason as Al, a content of N may be limited to 0.0005 to 0.005 wt % in order to not affect secondary recrystallization by S- and Se-based precipitates. Specifically, N may be included in an amount of 0.003 to 0.005 wt %. In the embodiment of the present invention, during the preparing process, a nitriding process is not included, and the slab and the content of N in the final prepared oriented electrical steel sheet may be the same.

In the embodiment of the present invention, the oriented electrical steel sheet may satisfy Equation 1.

$$16 \leq (10 \times [Mn]+[Cu])/([S]+[Se])+(0.02-[Al])/[N] \leq 20 \quad \text{[Equation 1]}$$

(In Equation 1, [Mn], [Cu], [S], [Se], [Al], and [N] represent the contents (wt %) of Mn, Cu, S, Se, Al, and N, respectively.)

When a value of Equation 1 is excessively small, rolling rupture may occur, or a large amount of S- and Se-based precipitates may be precipitated, thereby deteriorating the magnetic properties. When the value of Equation 1 is excessively large, the S- and Se-based precipitates are not properly formed, and the secondary recrystallized texture is damaged, and the magnetism may deteriorate. Specifically, the value of Equation 1 may be 16.2 to 19.9.

In the embodiment of the present invention, the oriented electrical steel sheet may satisfy Equation 2.

$$0.016 \leq [S]+[Se] \leq 0.05$$

(In Equation 2, [S] and [Se] represent the contents (wt %) of S and Se, respectively.)

When a value of Equation 2 is excessively small, the S- and Se-based precipitates are not properly formed, the secondary recrystallized texture is damaged, and the magnetism may deteriorate. When the value of Equation 2 is excessively large, a large amount of S- and Se-based precipitates may be precipitated, thereby deteriorating the magnetic properties. Specifically, the value of Equation 2 may be 0.02 to 0.03.

In the embodiment of the present invention, the oriented electrical steel sheet may satisfy Equation 3.

$$0.5 \leq [Al]/[N] \leq 3.0$$

(In Equation 3, [Al] and [N] represent the contents (wt %) of Al and N, respectively.)

When the value of Equation 3 is excessively small, the grain growth inhibition ability by the AlN may not be expected. When the value of Equation 3 is excessively large, the grain growth inhibition ability by the AlN increases, which affects the secondary recrystallization by the S- and Se-based precipitates. Specifically, the value of Equation 3 may be 0.5 to 2.8.

Impurity Element

In addition to the above elements, impurities such as Ni, Zr, and V, which are inevitably added, may be included. In the case of Ni, it reacts with impurity elements to form fine sulfides, carbides, and nitrides, which have a undesirable effect on magnetism, and thus these contents are limited to 0.05 wt % or less, respectively. Since Zr, V, etc. are also elements strongly forming carbonitrides, it is preferable that they are added as little as possible, and they are contained in an amount of 0.01 wt % or less, respectively.

In the embodiment of the present invention, by controlling the correlation between Mn, Cu, S, Se, Al, and N in the alloy component, magnetic properties may be further improved. Specifically, in a thickness standard of 0.30 mm, the iron loss in a condition of 1.7 Tesla and 50 Hz of the oriented electrical steel sheet may be 1.5 W/kg or less. More specifically, in the thickness standard of 0.30 mm, the iron loss in the condition of 1.7 Tesla and 50 Hz of the oriented electrical steel sheet may be 0.9 to 1.1 W/kg. A magnetic flux density B8 induced under the magnetic field of 800 A/m of the oriented electrical steel sheet may be 1.88 T or more. Specifically, it may be 1.88 to 1.95 T. When the magnetic flux density B8 is 1.88 T or more, there is an advantage of high transformer efficiency and low noise.

A preparing method of an oriented electrical steel sheet according to an embodiment of the present invention includes: preparing a slab; heating the slab; hot rolling the slab to prepare a hot rolled sheet; cold rolling the hot rolled sheet to prepare a cold rolled sheet; primary recrystallization annealing the cold rolled sheet; and secondary recrystallization annealing the cold rolled sheet in which the primary recrystallization annealing is completed.

Hereinafter, each step will be described in detail.

First, a slab is prepared.

In a steel making process, Si, C, Mn, Cu, S, Se, Al, and N may be controlled to an appropriate amount, and alloy elements, which are advantageous for forming a Goss texture, may be added as necessary. Molten steel whose components have been adjusted in the steel making process is prepared into a slab through continuous casting.

Each composition of the slab has been described in detail in the above-described oriented electrical steel sheet, so a duplicate description thereof is omitted. Equations 1 to 3 described above may be identically satisfied even in an alloy component of the slab.

Next, the slab is heated.

The heating of the slab is preferably performed at a low temperature of 1250° C. or less, more preferably 1150° C. or less, so that the precipitates are partially solvated. This is because, when the slab heating temperature is increased, a surface of the slab is melted, and thus it is required that a heating furnace is repaired and life of the heating furnace may be shortened. In addition, when the slab is heated at a temperature of 1250° C. or lower, and more preferably 1150° C. or lower, it is prevented that a columnar structure of the slab is coarsely grown, thereby preventing cracks from occurring in a width direction of the sheet in a subsequent hot-rolling process to improve an actual yield. When the temperature is less than 1000° C., the hot rolling temperature is low, so that deformation resistance of the steel sheet increases, which increases a rolling load. Therefore, the slab heating temperature may be 1000° C. to 1250° C.

Next, a hot rolled sheet is prepared by hot rolling the slab. A hot rolled sheet having a thickness of 1.5 to 4.0 mm may be prepared by the hot rolling.

The hot-rolled hot rolled sheet may be subjected to hot rolled sheet annealing or may be subjected to cold rolling without performing hot rolled sheet annealing, as necessary. In the case of performing the hot rolled sheet annealing, in order to make a hot-rolled structure uniform, it may be heated to a temperature of 900° C. or higher, and then cooled.

Next, a cold rolled sheet is prepared by cold rolling the hot rolled sheet. The cold rolling is performed by using a reverse mill or a tandem mill by cold rolling once or two times or more including intermediate annealing to prepare a cold rolled sheet having a final product thickness. It is advantageous to improve the magnetic property to perform warm rolling that maintains a temperature of the steel sheet at 100° C. or higher during the cold rolling.

Next, the cold-rolled cold rolled sheet is subjected to primary recrystallization annealing. In the primary recrystallization annealing process, primary recrystallization occurs in which nuclei of Goss grains are generated. In the primary recrystallization annealing process, decarburization of the steel sheet may be performed. For the decarburization, it may be performed in a dew point temperature of 50° C. to 70° C. and a mixed atmosphere of hydrogen and nitrogen. The primary recrystallization annealing temperature may be 800 to 950° C. When the annealing temperature is low, decarburization may take a long time. When the annealing temperature is high, the primary recrystallized grains grow coarse, and grain growth driving force is lowered, so that stable secondary recrystallization is not formed. In addition, an annealing time is not a big problem for the effect of the present invention, but may be set within 5 minutes in consideration of productivity. In the embodiment of the present invention, only decarburization is performed, and nitriding may not be performed. That is, the primary recrystallization annealing may be performed only at a dew point temperature of 50° C. to 70° C. and a mixed atmosphere of hydrogen and nitrogen.

The cold rolled sheet subjected to the primary recrystallization annealing includes S- and Se-based precipitates, and is used as a grain growth inhibitor during secondary recrystallization annealing. Specifically, the S- and Se-based precipitates may include one or more precipitates of (Fe,Mn,Cu)S and (Fe,Mn,Cu)Se. (Fe,Mn,Cu)S means a precipitate in which one or more of S, Fe, Mn, and Cu are combined.

Next, the cold rolled sheet in which the primary recrystallization annealing is completed is subjected to the secondary recrystallization annealing. In this process, a Goss {110}<001> texture is formed in which a {110} plane is parallel to the rolling plane and a <001> direction is parallel to the rolling direction. In this case, after an annealing separator is applied to the cold rolled sheet in which the primary recrystallization annealing is completed, the secondary recrystallization annealing may be performed. In this case, the annealing separator is not particularly limited, and an annealing separator containing MgO as a main component may be used.

In the secondary recrystallization annealing, a temperature is raised at an appropriate heating rate to form the second recrystallization of a {110}<001> Goss orientation, and then, after purification annealing, which is an impurity removal process, it is cooled. In the process, an annealing atmosphere gas is heat-treated using a mixed gas of hydrogen and nitrogen during the temperature rising process as in the general case, and 100% hydrogen gas is used in the purification annealing for a long time to remove impurities.

Hereinafter, preferred examples of the present invention and comparative examples will be described. However, the following examples are only preferred examples of the present invention, and the present invention is not limited to the following examples.

EXAMPLES

A slab including Si at 3.2 wt %, C at 0.055 wt %, and the contents of Mn, Cu, S, Se, Al, and N that were changed as shown in Table 1, and a remainder Fe and inevitable impurities was prepared. Subsequently, the slab was heated to 1250° C. and then hot rolled to prepare a 2.3 mm thick hot rolled sheet. The hot rolled sheet was heated at a temperature of 1085° C., then maintained at 910° C. for 160 seconds and quenched in water. Next, after pickling the hot-rolled annealing sheet, it was cold-rolled to a thickness of 0.30 mm, and the primary recrystallization annealing was performed for the cold-rolled steel sheet by maintaining it at a temperature of 850° C. for 180 seconds in a mixed gas atmosphere of hydrogen and nitrogen at a dew point of 60° C. After applying MgO, which is an annealing separator, to this steel sheet, the secondary recrystallization annealing was performed therefor, wherein the secondary recrystallization annealing was performed in a mixed gas atmosphere of "25 v % nitrogen+75 v % hydrogen" up to 1200° C. and in a gas atmosphere of 100 v % hydrogen after reaching 1200° C. for 10 hours or more, and then was furnace-cooled. Table 1 shows the magnetic properties of the oriented electrical steel sheet according to each component.

The iron loss was measured under the condition of 1.7 Tesla and 50 Hz using a single sheet measurement method, and the magnetic flux density (Tesla) induced under the magnetic field of 800 A/m was measured. Each iron loss value was an average of each condition.

TABLE 1

| Classification | Mn (wt %) | Cu (wt %) | S (wt %) | Se (wt %) | Al (wt %) | N (wt %) |
|---|---|---|---|---|---|---|
| Comparative Example 1 | 0.025 | 0.01 | 0.024 | 0.005 | 0.002 | 0.0038 |
| Comparative Example 2 | 0.025 | 0.01 | 0.003 | 0.059 | 0.0018 | 0.0039 |
| Comparative Example 3 | 0.024 | 0.011 | 0.003 | 0.006 | 0.0017 | 0.0035 |
| Comparative Example 4 | 0.025 | 0.01 | 0.007 | 0.008 | 0.0018 | 0.0038 |
| Inventive Example 1 | 0.025 | 0.012 | 0.01 | 0.011 | 0.0018 | 0.0035 |
| Inventive Example 2 | 0.025 | 0.031 | 0.01 | 0.01 | 0.002 | 0.0033 |
| Inventive Example 3 | 0.024 | 0.05 | 0.011 | 0.009 | 0.0017 | 0.0034 |
| Comparative Example 5 | 0.025 | 0.072 | 0.01 | 0.011 | 0.0015 | 0.0036 |
| Comparative Example 6 | 0.026 | 0.089 | 0.01 | 0.01 | 0.0016 | 0.0035 |
| Inventive Example 4 | 0.025 | 0.01 | 0.01 | 0.012 | 0.0051 | 0.0034 |
| Inventive Example 5 | 0.026 | 0.012 | 0.01 | 0.01 | 0.0098 | 0.0036 |
| Comparative Example 7 | 0.025 | 0.011 | 0.01 | 0.011 | 0.013 | 0.0037 |
| Inventive Example 6 | 0.036 | 0.011 | 0.01 | 0.015 | 0.01 | 0.0045 |
| Inventive Example 7 | 0.036 | 0.032 | 0.008 | 0.016 | 0.008 | 0.0043 |
| Inventive Example 8 | 0.036 | 0.052 | 0.009 | 0.016 | 0.007 | 0.0044 |
| Comparative Example 8 | 0.036 | 0.072 | 0.009 | 0.014 | 0.007 | 0.0045 |
| Comparative Example 9 | 0.036 | 0.104 | 0.009 | 0.015 | 0.008 | 0.0043 |
| Inventive Example 9 | 0.035 | 0.012 | 0.01 | 0.016 | 0.0019 | 0.0034 |
| Inventive Example 10 | 0.034 | 0.01 | 0.012 | 0.012 | 0.0066 | 0.0035 |
| Comparative Example 10 | 0.049 | 0.01 | 0.01 | 0.018 | 0.002 | 0.0038 |
| Comparative Example 11 | 0.05 | 0.011 | 0.018 | 0.041 | 0.0017 | 0.0035 |

TABLE 2

| Classification | Equation 1 value | Equation 2 value | Equation 3 value | Magnetic flux density (B8, Tesla) | Iron loss (W17/50, W/kg) |
|---|---|---|---|---|---|
| Comparative Example 1 | 13.7 | 0.029 | 0.526 | Rolling crack | |
| Comparative Example 2 | 8.86 | 0.062 | 0.462 | Rolling crack | |
| Comparative Example 3 | 33.12 | 0.009 | 0.486 | 1.48 | 2.39 |
| Comparative Example 4 | 22.12 | 0.015 | 0.474 | 1.83 | 1.23 |
| Inventive Example 1 | 17.68 | 0.021 | 0.514 | 1.94 | 0.91 |
| Inventive Example 2 | 19.5 | 0.02 | 0.606 | 1.92 | 0.95 |
| Inventive Example 3 | 19.88 | 0.02 | 0.5 | 1.91 | 0.96 |
| Comparative Example 5 | 20.47 | 0.021 | 0.417 | 1.85 | 1.17 |
| Comparative Example 6 | 22.71 | 0.02 | 0.457 | 1.82 | 1.27 |
| Inventive Example 4 | 16.2 | 0.022 | 1.5 | 1.92 | 0.96 |
| Inventive Example 5 | 16.43 | 0.02 | 2.722 | 1.9 | 0.98 |
| Comparative Example 7 | 14.32 | 0.021 | 3.514 | 1.86 | 1.15 |
| Inventive Example 6 | 17.06 | 0.025 | 2.222 | 1.88 | 1.03 |
| Inventive Example 7 | 19.12 | 0.024 | 1.86 | 1.9 | 0.99 |
| Inventive Example 8 | 19.43 | 0.025 | 1.591 | 1.92 | 0.96 |
| Comparative Example 8 | 21.67 | 0.023 | 1.556 | 1.68 | 1.80 |
| Comparative Example 9 | 22.12 | 0.024 | 1.86 | 1.71 | 1.71 |
| Inventive Example 9 | 19.25 | 0.026 | 0.559 | 1.88 | 1.03 |
| Inventive Example 10 | 18.41 | 0.024 | 1.886 | 1.91 | 0.97 |
| Comparative Example 10 | 22.59 | 0.028 | 0.526 | 1.47 | 2.48 |
| Comparative Example 11 | 13.89 | 0.059 | 0.486 | 1.48 | 2.45 |

As can be seen in Table 1 and Table 2, it can be confirmed that the magnetic flux density and the iron loss was excellent in the inventive examples satisfying Equation 1 by controlling the Mn, Cu, S, Se, Al, and N contents.

In contrast, in the comparative example that did not satisfy Equation 1, it can be confirmed that the edge crack occurred or the magnetic flux density and iron loss were deteriorated.

The present invention may be embodied in many different forms, and should not be construed as being limited to the disclosed embodiments. In addition, it will be understood by those skilled in the art that various changes in form and details may be made thereto without departing from the technical spirit and essential features of the present invention. Therefore, it is to be understood that the above-described exemplary embodiments are for illustrative purposes only, and the scope of the present invention is not limited thereto.

The invention claimed is:

1. A preparing method of an oriented electrical steel sheet, comprising:
    preparing a slab including, in a unit of wt %, Si at 1.0 wt % to 5.0 wt %, C at 0.001 wt % to 0.10 wt %, Mn at 0.001 wt % to 0.1 wt %, Cu at 0.001 wt % to 0.1 wt %, S at 0.001 wt % to 0.020 wt %, Se at 0.001 wt % to 0.050 wt %, Al at 0.0005 wt % to 0.010 wt %, N at 0.0005 wt % to 0.005 wt %, and the remainder of Fe and inevitable impurities, and satisfying Equation 1;
    heating the slab;
    hot rolling the slab to prepare a hot rolled sheet;
    cold rolling the hot rolled sheet to prepare a cold rolled sheet;
    primary recrystallization annealing the cold rolled sheet; and
    secondary recrystallization annealing the cold rolled sheet in which the primary recrystallization annealing is completed:

$$16 \leq (10 \times [Mn]+[Cu])/([S]+[Se])+(0.02-[Al])/[N] \leq 20 \quad \text{[Equation 1]}$$

wherein in Equation 1, [Mn], [Cu], [S], [Se], [Al], and [N] represent contents (wt %) of Mn, Cu, S, Se, Al, and N, respectively.

2. The preparing method of the oriented electrical steel sheet of claim 1, wherein
    the heating of the slab includes heating the slab at 1000 to 1250° C.

3. The preparing method of the oriented electrical steel sheet of claim 1, wherein
    the cold rolled sheet in which the primary recrystallization annealing is completed includes one or more precipitates of (Fe,Mn,Cu)S and (Fe,Mn,Cu)Se.

4. The preparing method of the oriented electrical steel sheet of claim 1, wherein
    the primary recrystallization annealing is performed in a hydrogen and nitrogen mixed atmosphere at a dew point temperature of 50° C. to 70° C.

* * * * *